(12) United States Patent
Hong et al.

(10) Patent No.: US 6,833,890 B2
(45) Date of Patent: Dec. 21, 2004

(54) LIQUID CRYSTAL DISPLAY

(75) Inventors: Mun-Pyo Hong, Seongnam (KR); Nam-Seok Roh, Seongnam (KR); Chong-Chul Chai, Seoul (KR); Kyong-Ju Shin, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 66 days.

(21) Appl. No.: 10/381,874

(22) PCT Filed: Jun. 25, 2002

(86) PCT No.: PCT/KR02/01211

§ 371 (c)(1),
(2), (4) Date: Mar. 27, 2003

(87) PCT Pub. No.: WO03/014819

PCT Pub. Date: Feb. 20, 2003

(65) Prior Publication Data

US 2004/0021804 A1 Feb. 5, 2004

(30) Foreign Application Priority Data

Aug. 7, 2001 (KR) .......................................... 2001-47487

(51) Int. Cl.⁷ ................................................ G02F 1/13
(52) U.S. Cl. ..................................................... 349/106
(58) Field of Search ................................ 349/106, 143, 349/144

(56) References Cited

U.S. PATENT DOCUMENTS 6,466,285 B1 * 10/2002 Ichikawa ..................... 349/95

FOREIGN PATENT DOCUMENTS

JP            4-165331      *  6/1992

* cited by examiner

*Primary Examiner*—James A. Dudek
(74) *Attorney, Agent, or Firm*—F. Chau & Associates, LLC

(57) ABSTRACT

A liquid crystal display includes pixels of red, blue and green arranged in a matrix form. The red, green and blue pixels are sequentially arranged in the row direction with the same color pixel neighbors in the column direction. Gate lines are arranged at the respective pixel rows to transmit scanning signals or gate signals, and data lines to transmit data signals are arranged at the respective pixel columns while defining the pixels. The pixel electrodes connected to each other by way of first and second pixel electrode connectors, which are alternately arranged at the pixel rows while taking the two neighboring blue pixel rows as a unit, are formed at the respective pixels. Thin film transistors are arranged with respect to the red and green pixels while being alternately arranged at the two neighboring blue pixel rows.

11 Claims, 6 Drawing Sheets

LIQUID CRYSTAL DISPLAY

BACKGROUND OF THE INVENTION (a) Field of the Invention

The present invention relates to a liquid crystal display.

(b) Description of the Related Art

Generally, a liquid crystal display has two substrates with electrodes, and a liquid crystal layer sandwiched between the two substrates. Voltages are applied to the electrodes so that the liquid crystal molecules in the liquid crystal layer are re-oriented to thereby control the light transmission.

The liquid crystal display has a plurality of pixels with pixel electrodes and color filters of red, green and blue. The pixels are driven by way of signals applied through the wiring lines. The wiring lines include scanning signal lines or gate lines for carrying scanning signals, and picture signal lines or data lines for carrying the picture signals. Each pixel is connected to one gate line and one data line.

There are several types of arrangement in the color filters of red, green and blue. Among them are a stripe type where the color filters of the same color are arranged at the respective pixel columns, a mosaic type where the color filters of red, green and blue are sequentially arranged in the pixel row and column directions, and a delta type where the pixels are zigzag-alternated in the pixel column direction, and the color filters of red, green and blue are sequentially arranged at the pixels. In the case of the delta type, the three unit pixels with the color filters of red, green and blue are operated as one dot, and this makes it easy to express a circle or a diagonal line.

The ClairVoyante Laboratories has proposed a pixel arrangement structure called the "PenTile Matrix™," which has a high resolution expression capacity advantageous in displaying pictures while being involved minimized design-cost. In such a pixel arrangement structure, the unit pixel of blue is common to two dots, and the neighboring blue pixels receive the data signals from one data driving IC while being driven by two different gate driving ICs. With the use of the PenTile Matrix pixel structure, the resolution of the UXGA level can be realized by way of a display device of the SVGA level. Furthermore, the number of low-cost gate driving ICs is increased, but the number of high-cost data driving ICs is decreased. This minimizes the design cost for the display device.

However, in the above-structured liquid crystal display, the unit pixels of blue are arranged in the shape of a diamond and correspondingly, the signal lines for carrying the data signals are bent. Consequently, only the data signal line for transmitting the relevant signals to the blue pixels is elongated so that delay in the signal transmission is made with respect to the data signals for the blue pixels, and the display characteristic becomes to be non-uniform. Therefore, there is a limit in applying the Pentile Matrix pixel arrangement structure to the large-sized liquid crystal display. Furthermore, the red or green pixels are provided around the blue pixel per the two pixel columns, and the blue pixel differs in size from the red or green pixel. This makes it very difficult to form storage capacity required for the liquid crystal display.

Meanwhile, the data signal lines for transmitting data signals to the red or green pixels, or two gate signal lines are placed close to each other so that the wiring lines are liable to be short-circuited while reducing the production yield and deteriorating the display characteristic. Furthermore, as the neighboring blue pixels are driven by one driving IC, the data driving IC should be provided at both sides of the display region and this induces enlargement of the display device. In addition, with this structure, it becomes difficult to form repair lines at the periphery of the display region. The repair lines are to prevent the wiring lines from being cut or short-circuited.

SUMMARY OF THE INVENTION

It is an object of the present invention to provide a liquid crystal display which involves excellent display capacity while preventing the signal is lines at the neighboring pixels from being short-circuited.

It is another object of the present invention to provide a liquid crystal display which involves excellent display capacity while securing the required storage capacity in a stable manner.

It is still another object of the present invention to provide a liquid crystal display which involves excellent display capacity while being minimized in the substrate size with repair lines for repairing possible cutting or short-circuiting of the wiring line.

These and other objects may be achieved by a liquid crystal display with the following features. A data pad connection unit electrically interconnects the data lines at the neighboring blue pixel columns by way of one pad. The neighboring gate lines or the neighboring data lines are spaced apart from each other while interposing the pixels.

According to one aspect of the present invention, the liquid crystal display includes pixels of red, blue and green arranged in a matrix form. The red, green and blue pixels are sequentially arranged in the row direction with the same color pixel neighbors in the column direction. Gate lines are arranged at the respective pixel rows to transmit scanning signals or gate signals while proceeding in the horizontal direction. Data lines cross over the gate lines in an insulating manner to transmit data signals while defining the pixels. The data lines are arranged at the respective pixel columns while proceeding in the vertical direction. The pixel electrodes are formed at the respective pixels. The pixel electrodes of neighboring blue pixel rows are connected to each other by way of first and second pixel electrode connectors. The first and the second pixel electrode connectors are alternately arranged at the pixel rows while taking the two neighboring blue pixel rows as a unit. Thin film transistors are arranged at the crossing area of the gate lines and the data lines with respect to the red and green pixels while being alternately arranged at the two neighboring blue pixel rows. The thin film transistors have gate electrodes connected to the gate lines, source electrodes connected to the data lines, and drain electrodes connected to the pixel electrodes.

The pixel electrodes are overlapped with the front gate lines for transmitting the scanning or gate signals to the front pixel rows to thereby form storage capacitors. One of the first and the second pixel Electrode connectors is overlapped with the gate line for transmitting the scanning or gate signals to the pixel row corresponding thereto. The parasitic capacitance due to the overlapping of the pixel electrode connector and the gate line is 5% or less of the sum of the liquid crystal capacitance and the storage capacitance.

Data pad connectors interconnect the data lines for transmitting the data signals to the pixel columns while taking the two neighboring blue pixel columns as a unit by way of one pad.

The data pad connectors are formed with first and second data pad connectors. The first data pad connectors are formed at the same plane as the pixel electrodes or the gate lines while crossing the data lines at the red and green pixels arranged between the two blue pixel columns. The second data pad connectors are connected to the data lines at the two blue pixel columns while being electrically connected to each other by way of the first data pad connectors.

According to another aspect of the present invention, the liquid crystal display includes pixels arranged in a matrix form. The pixels have red and green pixels sequentially arranged in the row direction with the same color pixel neighbors in the column direction, and blue pixels each being surrounded by the two red pixels and the two green pixels. Gate lines are horizontally arranged at the red and green pixel rows while traversing the centers of the blue pixels to transmit scanning signals or gate signals. Data lines cross over the gate lines in an insulating manner while proceeding in the vertical direction. The arrangement of the data lines is made through taking the red, green and blue pixel columns as a unit. Pixel electrodes are arranged at the respective pixels. Thin film transistors are arranged at the respective pixels with gate electrodes connected to the gate lines, source electrodes connected to the data lines, and the drain electrodes connected to the pixel electrodes.

A storage capacitor line assembly is overlapped with the pixel electrodes to form storage capacitors. The storage capacitor line assembly has first storage capacitor lines proceeding in the horizontal direction while being alternated with the gate lines, and second storage capacitor lines connected to the first storage capacitor lines while being extended in-between the red, green and blue pixels.

The pixel electrodes are formed with a transparent conductive material or a reflective conductive material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of this invention will be explained with reference to the accompanying drawings.

Figure 1:
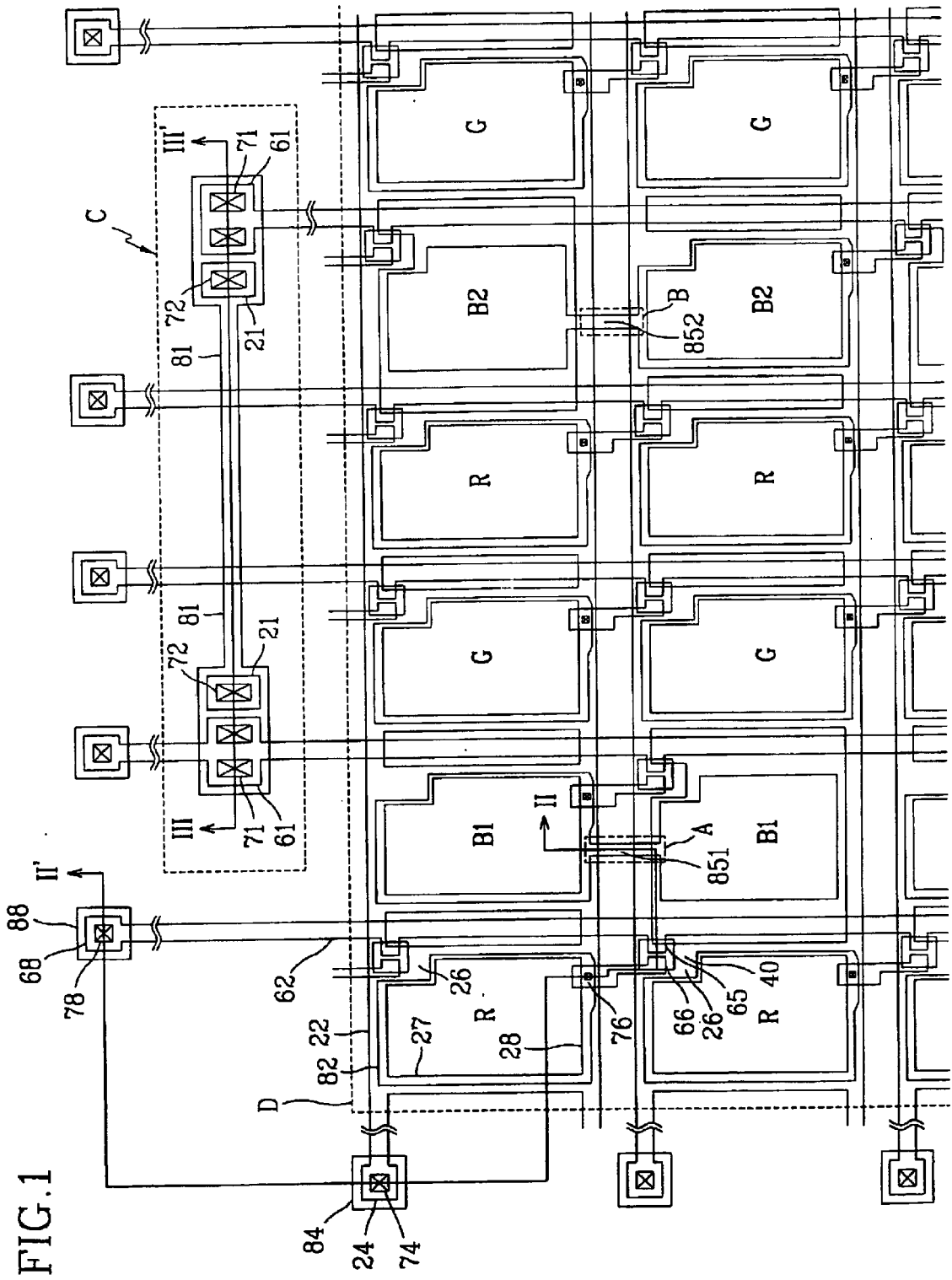
FIG. 1 is a plan view of a liquid crystal display according to a first preferred embodiment of the present invention.
Figure 2:
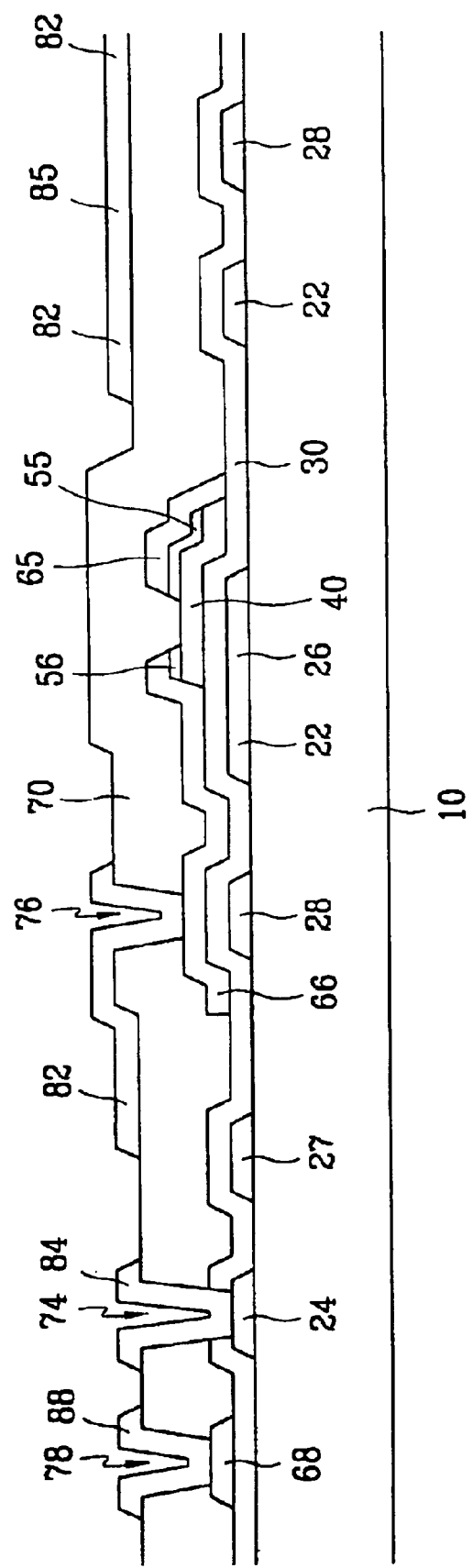
FIG. 2 is a cross sectional view of the thin film transistor array panel for the liquid crystal display taken along the II-II' line of FIG. 1.
Figure 3:
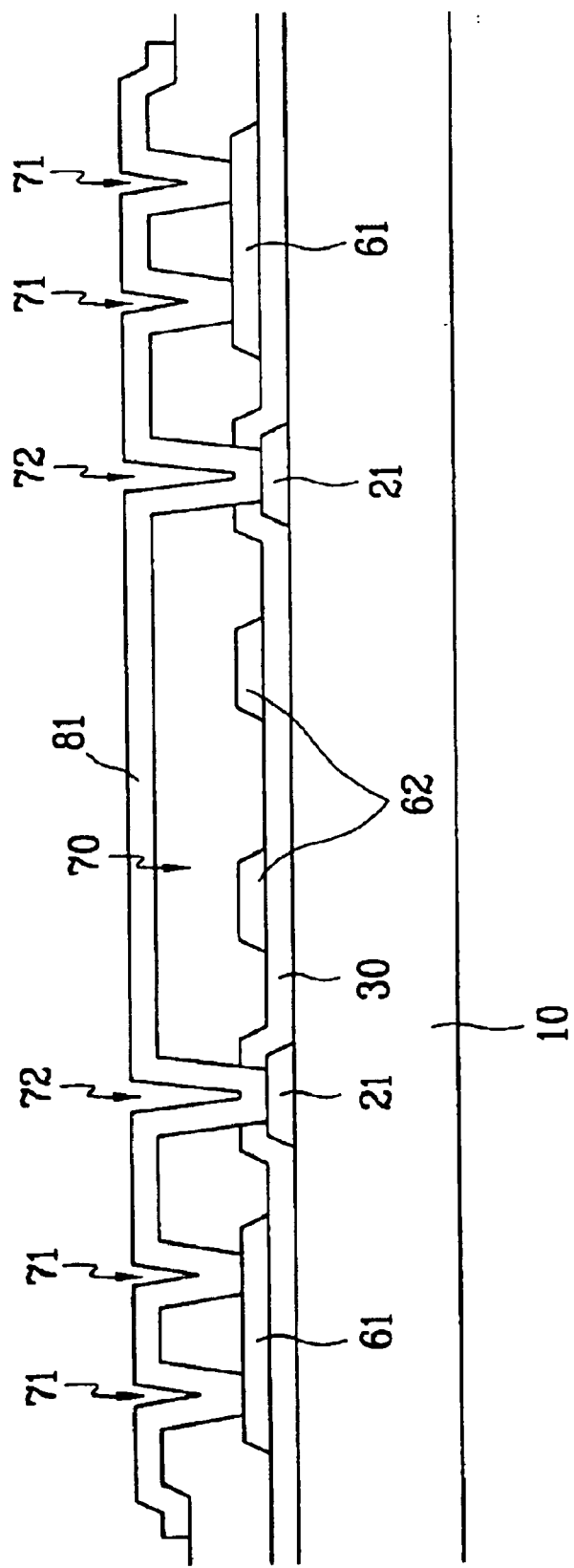
FIG. 3 is a cross sectional view of the thin film transistor array panel for the liquid crystal display taken along the III-III' line of FIG. 1.

FIG. 1 is a plan view of a liquid crystal display according to a first preferred embodiment of the present invention, and FIGS. 2 and 3 are cross sectional views of the thin film transistor array substrate taken along the II-II' line and the III-III' line of FIG. 1. FIG. 2 specifically illustrates the pixel area and the pad area. FIG. 3 illustrates a connection unit C for interconnecting the data lines for transmitting data signals to the neighboring blue pixels B1 and B2 by way of one pad.

As shown in FIG. 1, pixels of red, blue and green R, B1, G, R, B2, and G are arranged in a matrix form at the liquid crystal display. The red, blue and green pixels R, B1, G, R, B2 and G are sequentially arranged in the row direction with the same color pixel neighbors in the column direction. Alternatively, the red and green pixels R and G may be arranged such that the same color pixels face each other with respect to the blue pixels B1 and B2 in the diagonal direction. Gate lines (or scanning lines) 22 for carrying scanning signals or gate signals are formed at the respective pixel rows one by one while proceeding in the horizontal direction. Data lines 62 for carrying data signals cross over the gate lines 22 in an insulating manner while defining unit pixels. The data lines 62 are provided at the respective pixel columns one by one while proceeding in the vertical direction.

Thin film transistors are formed at the crossing area of the gate lines 22 and the data lines 62. Each thin film transistor has a gate electrode 26 connected to the gate line 22, a source electrode 65 connected to the data line 62, and a drain electrode 66 facing the source electrode 65 around the gate electrode 26 together with a semiconductor layer 40. A pixel electrode 82 is formed at each pixel such that it is electrically connected to the gate line 22 and the data line 62 through the thin film transistor. The pixel electrodes 82 for the blue pixels B1 and B2 at the two neighboring pixel rows are connected to each other by way of first and second pixel electrode connectors 851 and 852, which are alternately formed at each pixel column. The two neighboring blue pixels B1 and B2 with such pixel electrodes 82 involve one thin film transistor. The thin film transistors at the blue pixels B1 and B2 are alternately formed at each pixel row.

The structure of the thin film transistor array substrate with such a pixel arrangement structure will be now explained with reference to FIGS. 1 to 3.

As shown in FIGS. 1 to 3, a gate line assembly is formed on an insulating substrate 10 with a metallic conductive material such as aluminum, aluminum alloy, molybdenum, chrome, tantalum, silver and silver alloy. The gate line assembly includes scanning lines or gate lines 22 and 28 doubly proceeding in the horizontal direction, gate electrodes 26 connected to the gate lines 22, gate line connectors 27 for interconnecting the gate lines 22 and 28, and gate pads 24 connected to the ends of the gate lines 22 to receive scanning signals from the outside and transmit them to the gate lines 22. The gate line assembly is overlapped with pixel electrodes 82 to thereby form storage capacitors for enhancing the electric potential storage capacity of the pixels. In case the desired amount of storage capacity is not obtained with the overlapping, a storage capacitor line assembly may be separately formed at the same plane as the gate line assembly such that it is overlapped with the pixel electrodes 82.

Meanwhile, first data pad connectors 21 are formed at the same plane as the gate line assembly. The first data pad connectors 21 are placed at the C area external to the display area D to interconnect the data lines 62 at the neighboring blue pixel columns by way of one data pad 68 such that data signals are commonly transmitted to the pixel electrodes 82 at the neighboring blue pixel columns. The display area D refers to the area with the set of red, blue and green pixels R, B1, G, R, B2 and G.

The gate line assembly may be formed with a single-layered structure, a double-layered structure, or a triple-layered structure. In case the gate line assembly is formed with a double-layered structure, one layer is formed with a low resistance material, and the other layer is formed with a material bearing a good contact characteristic with other materials. For instance, Cr/Al or Al alloy or Al/Mo may be used for that purpose.

A gate insulating layer 30 is formed on the gate line assembly and the data pad connectors 21 with silicon nitride SiNx while covering them.

A semiconductor layer 40 is formed on the gate insulating layer 30 with hydrogenated amorphous silicon, and ohmic contact layers 55 and 56 are formed on the semiconductor layer 40 with amorphous silicon where n type impurities such as P are doped at high concentration.

A data line assembly is formed on the ohmic contact layers 55 and 56 with a conductive material such as Al, Al alloy, Mo, MoW alloy, Cr, Ta, Cu and Cu alloy. The data line assembly has a data line unit with data lines 62 proceeding in the vertical direction, source electrodes 65 connected to the data lines 62, and data pads 68 connected to the one-sided ends of the data lines 62 to receive picture signals from the outside. The data line assembly further has drain electrodes 66 facing the source electrodes 65 around the gate electrodes 26 while being separated from the data line unit. The data lines 62 at the neighboring blue pixel columns B1 and B2 have second data pad connectors 61 protruded from the ends thereof with a relatively large width. The first data pad connectors 21 are placed close to the second data pad connectors 61.

The data line assembly and the second data pad connectors 61 may be formed with a single-layered structure, a double-layered structure, or a triple-layered structure. In case they are formed with a double-layered structure, it is preferable that one layer is formed with a low resistance material, and the other layer is formed with a material bearing a good contact characteristic with other materials.

The ohmic contact layers 55 and 56 have a function of lowering the contact resistance between the underlying semiconductor layer 40 and the overlying source and drain electrodes 65 and 66.

A protective layer 70 is formed on the data line assembly and the semiconductor layer 40. The protective layer 70 has contact holes 76 and 78 exposing the drain electrodes 66 and the data pads 68, and contact holes 74 exposing the gate pads 24 together with the gate insulating layer 30. The protective layer 70 may be formed with silicon nitride or an acryl-based organic insulating material. Furthermore, the protective layer 70 has contact holes 71 exposing the second data pad connectors 61, and contact holes 72 exposing the first data pad connectors 21 together with the gate insulating layer 30.

Pixel electrodes 82 are formed on the protective layer 70 to receive picture signals from the thin film transistors and generate electric fields together with a common electrode formed at the counter substrate. The pixel electrodes 82 are formed with a transparent conductive material such as indium tin oxide (ITO) and indium zinc oxide (IZO). The pixel electrodes 82 are physico-electrically connected to the drain electrodes 66 of the thin film transistors formed at the neighboring pixel rows through the contact holes 76 to receive picture signals. The pixel electrodes 80 at the same pixel row are overlapped with the front gate line to thereby form storage capacitors. In case the desired storage capacity is not obtained, a storage capacitor line assembly may be formed in a separate manner.

The pixel electrodes 82 at the neighboring blue pixel rows B1 and B2 are connected to each other by way of first and second pixel electrode connectors 851 and 852. The pixel electrodes 82 at the neighboring blue pixel rows B1 and B2 are connected to the thin film transistors, which are alternately arranged at the neighboring blue pixel columns one by one with respect to the two pixel rows. Therefore, at the B area, the second pixel electrode connectors 852 are overlapped with the front gate line 22. However, at the A area, the first pixel electrode connectors 851 interconnecting the pixel electrodes 82 at the blue pixels B1 are overlapped with the gate line 22 corresponding thereto. Consequently, parasitic capacitance is made due to the overlapping of the first pixel electrode connectors 851 and the gate line 22 corresponding thereto. This causes kick-back voltages, which deteriorate the pixel voltages applied to the relevant pixel electrodes 82.

In order to solve such a problem, in the structure where the storage capacity is formed through overlapping the gate line 22 with the pixel electrodes 82, the storage capacity should be formed in a uniform manner. For this purpose, at the A area, the range of overlapping between the first pixel electrode connectors 851 and the gate line 22 should be optimized such that the parasitic capacitance due to the overlapping thereof be 5% or less of the sum of the liquid crystal capacitance and the storage capacitance of the relevant pixels. The reason is that in case the parasitic capacitance between the first pixel electrode connectors 851 and the gate line 22 exceeds 5% of the sum of the liquid crystal capacitance and the storage capacitance of the relevant pixels, the kick-back voltage is increased by 1V or more so that the brightness difference is made among the pixels in a serious manner.

Meanwhile, subsidiary gate pads 84 and subsidiary data pads 88 are selectively formed at the same plane as the pixel electrodes 82 while being connected to the gate and the data pads 24 and 68 through the contact holes 74 and 78 of the protective layer 70 and the gate insulating layer 30.

Third data pad connectors 81 are formed at the same plane as the pixel electrodes 82 to electrically interconnect the data lines 62 for transmitting data signals to the neighboring blue pixel columns B1 and B2 by way of one data pad 68. The two second data pad connectors 61 connected to the data lines 62 to transmit data signals to the two neighboring blue pixel columns B1 and B2 as well as the first data pad connectors 21 positioned close thereto are connected to the third data pad connectors 81 through the contact holes 71 and 72. The third data pad connectors 81 cross over the data lines for the neighboring red and green pixels R and G in an insulating manner while electrically interconnecting the two data lines 62 for the neighboring blue pixels by way of one data pad 68.

When the data lines 62 at the neighboring blue pixels B1 and B2 are connected to each other by way of one data pad 68 while using the first to the third data pad connectors 21, 61 and 81, additional resistance may be made during the transmission of the data signals due to the contact resistance at the contact holes 71 and 72 and the wiring resistance at the first to the third data pad connectors 21, 61 and 81. It is preferable that the additional load resistance by way of the addition of the connectors is established to be 20% or less of the total load resistance of the data lines 62. The reason is that in case the additional load resistance exceeds 20% of the total load resistance of the data lines 62, the pixel storage capacity becomes reduced to be 5% or more, and this deteriorates the display characteristic.

Meanwhile, in the structure shown in FIGS. 1 to 3, the third data pad connectors 81 formed at the same plane as the pixel electrodes 82 are used as the connectors for interconnecting the data lines for transmitting the data signals to the two blue pixels B1 and 62 by way of one pad. Alternatively, the second data pad connectors may be used for that purpose. The structure of such connectors will be now explained with reference to FIGS. 4 and 5.

Figure 4:
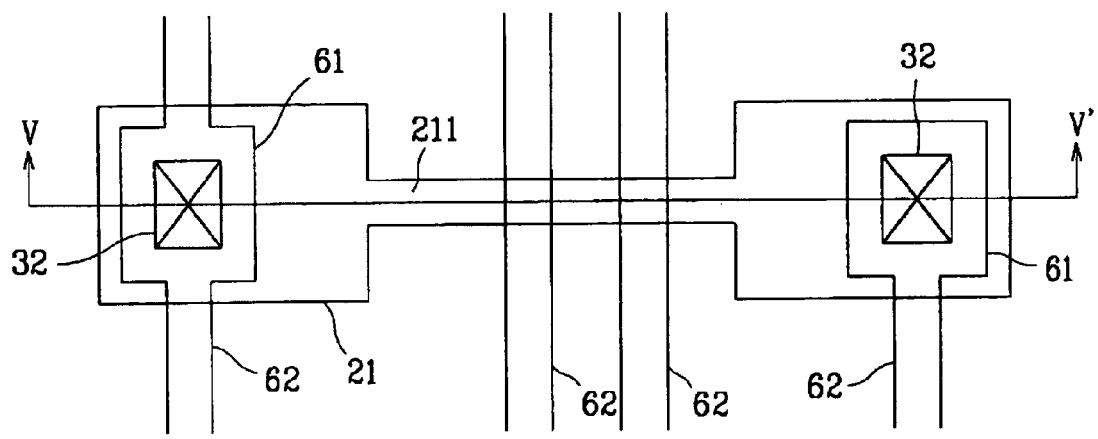
FIG. 4 is a plan view of the thin film transistor array panel for a liquid crystal display according to a second preferred embodiment of the present invention.
Figure 5:
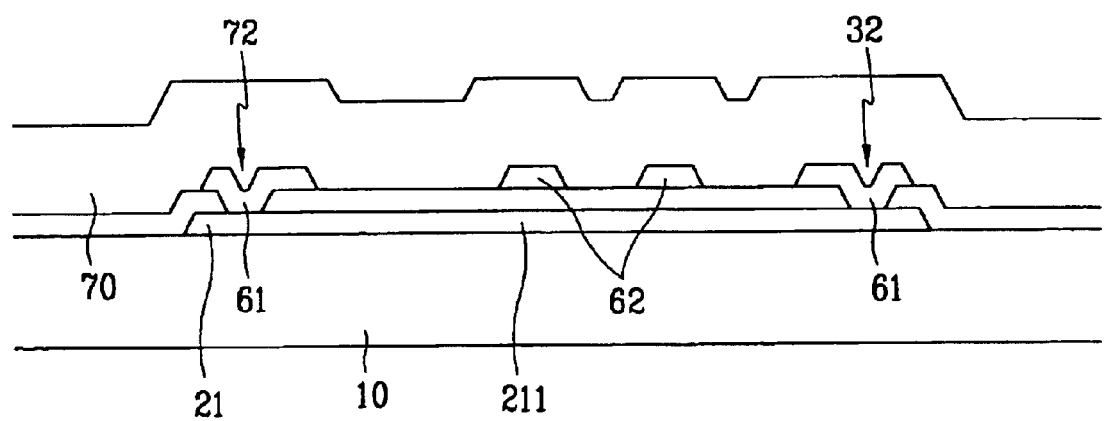
FIG. 5 is a cross sectional view of the thin film transistor array panel for the liquid crystal display taken along the V-V' line of FIG. 4.

FIG. 4 is a plan view of a thin film transistor array substrate for a liquid crystal display according to a second preferred embodiment of the present invention illustrating the data pad connectors, and FIG. 5 is a cross sectional view of the thin film transistor array substrate taken along the V-V' line of FIG. 4.

As shown in FIGS. 4 and 5, two first data pad connectors 21 for interconnecting the data lines 62 at the neighboring blue pixels are connected to each other by way of an interconnection pattern. The gate insulating layer 30 has contact holes 32 exposing the two first data pad connectors 21, respectively. The two data lines 62 for transmitting data signals to the neighboring blue pixels are electrically connected to each other such that the second data pad connectors 61 connected thereto are connected to the first data pad connectors 21 through the contact holes 32.

In addition to the transparent conductive material such as ITO and IZO, a reflective conductive material such as aluminum, aluminum alloy, silver and silver alloy may be used to form the pixel electrodes 82.

The above structure similar to the Pentile Matrix pixel arrangement structure is easily applied for use in displaying picture images or the shape of a circle and a diagonal line while making the expression of a letter or a device so that the resolution of the UXGA degree can be realized with the pixel arrangement of SVGA while decreasing the number of the data pads 68. In this way, the number of high cost data driving ICs can be decreased while minimizing the cost involved in designing the display device. Furthermore, the data lines for transmitting the data signals to the blue pixels are formed with the same shape as the data lines for transmitting the data signals to the red and green pixels while preventing the display characteristic from being deteriorated in a non-uniform manner. Furthermore, the desired amount of storage capacity is obtained with the overlapping of the front gate lines and the pixel electrodes, and the parasitic capacitance due to the overlapping of their own gate lines and the pixel electrode connectors is optimized so that the storage capacity can be formed in a uniform manner. In addition, the data lines are arranged at the red or green pixels while interposing the unit pixels so that the short circuit between the neighboring data lines can be prevented. Furthermore, when the neighboring blue pixels are driven using one driving IC, the data driving ICs may be arranged at one-sided area around the display area using the data pad connectors so that the display device can be optimized in size. In this way, repair lines for repairing the cutting or short-circuiting of the wiring lines can be easily formed at the periphery of the display area.

Figure 6:
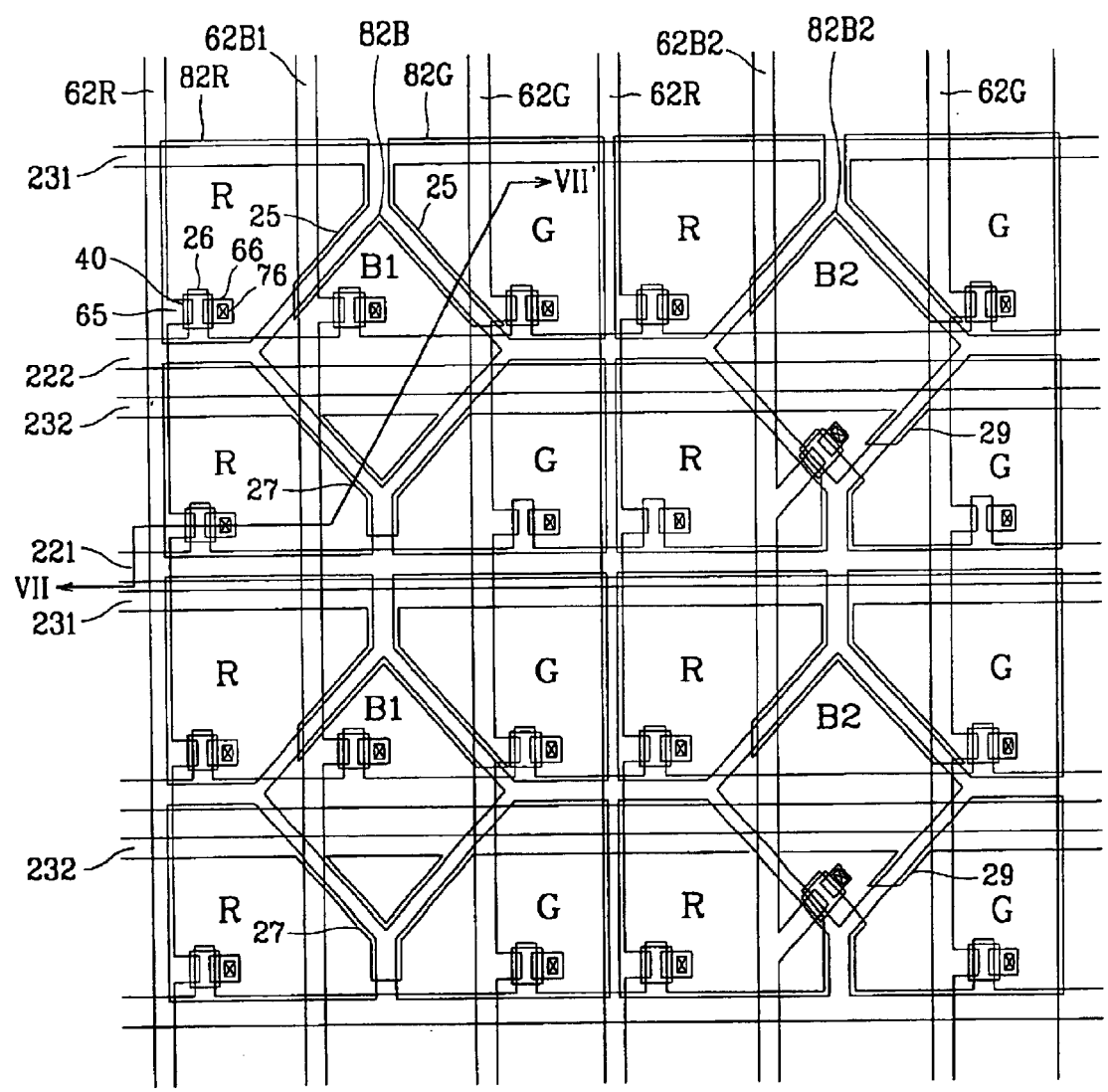
FIG. 6 is a plan view of a liquid crystal display according to a third preferred embodiment of the present invention.
Figure 7:
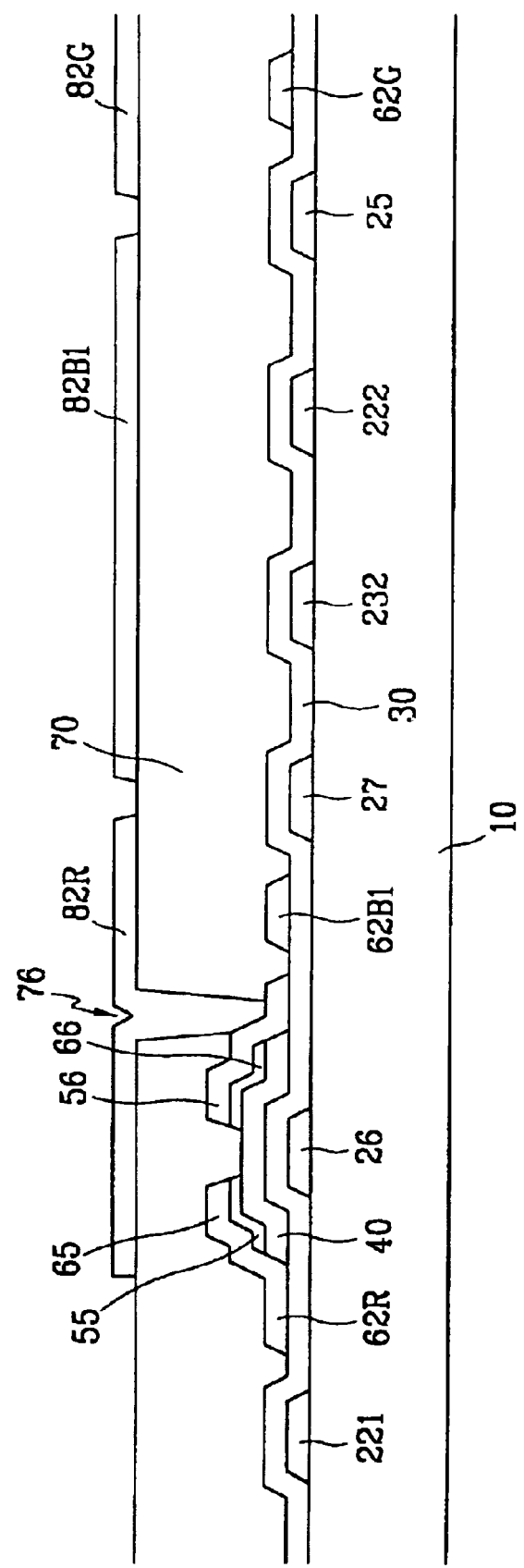
FIG. 7 is a cross sectional view of the thin film transistor array panel for the liquid crystal display taken along the VII-VII' line of FIG. 6.

FIG. 6 is a plan view of a liquid crystal display according to a third preferred embodiment of the present invention, and FIG. 7 is a cross sectional view of the thin film transistor array substrate taken along the VII-VII' line of FIG. 6.

As shown in FIG. 6, the pixels of red, blue and green color filters R, B1, G, R, B2 and G are arranged at the substrate in the Pentile Matrix form. The pixels of red, blue and green R, B1, G, R, B2 and G are sequentially arranged in the row direction with the same color pixel neighbors in the column direction. The blue pixels B1 and B2 are formed with a diamond shape. The four pixels of red and green R and G are arranged at the four sides of the diamond-shaped blue pixels B1 and B2, respectively.

Gate lines or scanning lines 221 and 222 are formed at the respective pixel rows one by one while proceeding in the horizontal direction, and data lines 62R, 62B1, 62G, 62R, 62B2 and 62G cross over the gate lines 221 and 222 while proceeding in the vertical direction. Furthermore, pixel electrodes 82R, 82B1, 82G, 82R, 82B2 and 82G are formed at the respective pixels R, B1, G, R, B2 and G such that picture signals are transmitted thereto through the data lines 62R, 62B1, 62G, 62R, 62B2 and 62G. A storage capacitor line assembly is overlapped with the pixel electrodes 82R, 82B1, 82G, 82R, 82B2 and 82G. The storage capacitor line assembly has first storage capacitor lines 231 and 232 proceeding in the horizontal direction, and second storage capacitor lines 25, 27 and 29 extended from the first storage capacitor lines 231 and 232 along the sides of the pixel electrodes 82B1 and 82B2 at the blue pixels. Thin film transistors including gate electrodes 26, source electrodes 65 and drain electrodes 66 are formed at the respective pixels such that they are connected to the gate lines 221 and 222, the data lines 62R, 62B1, 62G, 62R, 62B2 and 62G, and the pixel electrodes 82R, 82B1, 82G, 82R, 82B2 and 82G.

Specifically, a gate line assembly and a storage capacitor line assembly are formed on a transparent insulating substrate 10. The gate line assembly includes scanning lines or gate lines 221 and 222 proceeding in the horizontal direction, and gate electrodes 26 connected to the gate lines 22. The gate line assembly may further include gate pads connected to the ends of the gate lines 221 and 222. The gate electrodes 26 connected to the gate line 221 are formed only at the blue pixel columns B1, and the gate electrodes 26 connected to the other gate line 222 are formed only at the blue pixel columns B2. The storage capacitor line assembly includes first storage capacitor lines 231 and 232 proceeding in the horizontal direction while being alternated with the gate lines 221 and 222, and second storage capacitor lines 25, 27 and 29 extended from the first storage capacitor lines 231 and 232 along the boundaries of the pixels of red, blue and green R, B1, G, R, B2 and G. The storage capacitor line assembly is overlapped with the pixel electrodes 82R, 82B1, 82G, 82R, 82B2 and 82G of the pixels R, B1, G, R, B2 and G to thereby form storage capacitors. The two neighboring gate lines 221 and 222 are spaced apart from each other at both sides of the first storage capacitor lines 231 and 232 while preventing the gate line assembly from being short-circuited.

A gate insulating layer 30 covers the gate line assembly and the storage capacitor line assembly, and a data line assembly is formed on the gate insulating layer 30 with a low resistance conductive material. The data line assembly includes data lines 62R, 62B1, 62G, 62R, 62B2 and 62G formed at the pixels of red, blue and green R, B1, G, R, B2 and G one by one while proceeding in the vertical direction, source electrodes 65 connected to the data lines, and drain electrodes 66 facing the source electrodes 65 around the gate electrodes 26. The data line assembly may further include data pads connected to the one-sided ends of the data lines to receive picture signals from the outside.

The data lines 62R at the red pixel columns R are placed at the boundary of the red and green pixels, the data lines 62B1 and 62B2 at the blue pixel columns B1 and B2 are placed at the center of the red and blue pixel columns. The data lines 62G at the green pixel columns G are placed at the center of the green pixel columns. Accordingly, the data lines 62R, 62B1, 62G, 62R, 62B2 and 62G at the respective pixel columns are spaced apart from each other with a predetermined distance while preventing the data lines 62R, 62B1, 62G, 62R, 62B2 and 62G from being short-circuited. Furthermore, the interference of the data signals applied to the data lines can be also prevented.

A protective layer 70 is formed on the data line assembly and the semiconductor layer 40 with silicon nitride or an acryl-based organic insulating material. Pixel electrodes 82R, 82B1, 82G, 82R, 82B2 and 82G are formed on the protective layer 70 at the respective pixels R, B1, G, R, B2 and G while being connected to the drain electrodes 76 through the contact holes 76.

Of course, the above structure involves a data pad connection structure where the data lines at the two neighboring pixels are connected to each other by way of a data pad.

The desired amount of storage capacity is obtained by way of a storage capacitor line assembly while involving a Pentile Matrix pixel arrangement structure, and this enhances the display characteristic. The signal lines for transmitting gate and data signals to the neighboring pixel rows and columns are spaced apart from each other with a predetermined is distance, and this prevents the wiring lines from being short-circuited. Furthermore, the data lines are placed at the center of the pixels with an optimum length so that the delay in signal transmission through the data lines can be uniformly made.

Meanwhile, such a structure where the signal line is placed at the center of the pixel may be well adapted for use in a reflective type liquid crystal display with pixel electrodes based on a reflective conductive material. The protective layer 70 interposed between the data line assembly and the pixel electrodes is preferably made with an organic insulating material bearing a low dielectric constant. The protective layer 70 may be surface-treated to bear prominent and depressed portions while heightening the light reflection rate. The protective layer 70 may be formed with a colored insulating layer bearing a low light reflection and a low light transmission. In this way, the protective layer 70 may have a function of a black matrix where the leakage of light between the neighboring pixels is intercepted or the light incident upon the semiconductor layer 40 is intercepted. Alternatively, the gate line assembly, the data line assembly and the storage capacitor line assembly may be varied in shape such that they function as a black matrix for intercepting the leakage of light between the pixels.

As described above, in the inventive pixel arrangement structure, the high resolution expression capacity being advantageous in displaying a letter or a device is exerted while minimizing the design cost. As the data lines for transmitting signals to the blue unit pixels are linearly formed with the same shape as other wiring lines so that the display characteristic can be obtained in a uniform manner. Furthermore, the storage capacity can be obtained using the front gate lines while optimizing the parasitic capacitance due to the overlapping of the pixel electrode connectors and their own gate lines, and forming the storage capacity in a uniform manner. In addition, the data line assembly and the gate line assembly are spaced apart from each other with a predetermined distance while preventing the neighboring wiring lines from being short-circuited. The data-driving ICs may be arranged at one-sided regions of the display area using the data pad connectors while optimizing the size of the display device. In this case, the repair lines may be easily formed at the periphery of the display area to repair the possible cutting or the short-circuiting of the wiring lines.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:

pixels of red, blue and green arranged in a matrix form, the red, green and blue pixels being sequentially arranged in the row direction with the same color pixel neighbors in the column direction;

gate lines arranged at the respective pixel rows to transmit scanning signals or gate signals while proceeding in the horizontal direction;

data lines crossing over the gate lines in an insulating manner to transmit data signals while defining the pixels, the data lines being arranged at the respective pixel columns while proceeding in the vertical direction;

pixel electrodes formed at the respective pixels, the pixel electrodes being connected to each other by way of first and second pixel electrode connectors, the first and the second pixel electrode connectors being alternately arranged at the pixel rows while taking the two neighboring blue pixel rows as a unit; and thin film transistors arranged at the crossing area of the gate lines and the data lines with respect to the red and green pixels while being alternately arranged at the two neighboring blue pixel rows, the thin film transistors comprising gate electrodes connected to the gate lines, source electrodes connected to the data lines, and drain electrodes connected to the pixel electrodes.

2. The liquid crystal display of claim 1 wherein the pixel electrodes are overlapped with the front gate lines for transmitting the scanning or gate signals to the front pixel rows to thereby form storage capacitors.

3. The liquid crystal display of claim 2 wherein one of the first and the second pixel electrode connectors is overlapped with the gate line for transmitting the scanning or gate signals to the pixel row corresponding thereto, and the parasitic capacitance due to the overlapping of the pixel electrode connector and the gate line is 5% or less of the sum of the liquid crystal capacitance and the storage capacitance.

4. The liquid crystal display of claim 1 further comprising data pad connectors interconnecting the data lines for transmitting the data signals to the pixel columns while taking the two neighboring blue pixel columns as a unit by way of one pad.

5. The liquid crystal display of claim 4 wherein the data pad connectors are formed with first and second data pad connectors, the first data pad connectors being formed at the same plane as the pixel electrodes or the gate lines while crossing the data lines at the red and green pixels arranged between the two blue pixel columns, the second data pad connectors being connected to the data lines at the two blue pixel columns while being electrically connected to each other by way of the first data pad connectors.

6. The liquid crystal display of claim 1 wherein the pixel electrodes are formed with a transparent conductive material or a reflective conductive material.

7. A liquid crystal display comprising:

pixels arranged in a matrix form, the pixels comprising red and green pixels sequentially arranged in the row direction with the same color pixel neighbors in the column direction, and blue pixels each being surrounded by the two red pixels and the two green pixels;

gate lines horizontally arranged at the red and green pixel rows while traversing the centers of the blue pixels to transmit scanning signals or gate signals;

data lines crossing over the gate lines in an insulating manner while proceeding in the vertical direction, the arrangement of the data lines being made through taking the red, green and blue pixel columns as a unit;

pixel electrodes arranged at the respective pixels; and thin film transistors arranged at the respective pixels with gate electrodes connected to the gate lines, source electrodes connected to the data lines, and the drain electrodes connected to the pixel electrodes.

8. The thin film transistor array substrate of claim 7 further comprising a storage capacitor line assembly overlapped with the pixel electrodes to form storage capacitors, the storage capacitor line assembly comprising first storage capacitor lines proceeding in the horizontal direction while being alternated with the gate lines, and second storage capacitor lines connected to the first storage capacitor lines while being extended in-between the red, green and blue pixels.

9. The liquid crystal display of claim 8 further comprising data pad connectors interconnecting the data lines for transmitting the data signals to the pixel columns while taking the two blue pixel columns as a unit by way of one pad.

10. The liquid crystal display of claim 9 wherein the data pad connectors are formed with first data pad connectors formed at the same plane as the pixel electrodes or the gate lines while crossing the data lines at the red and green pixels arranged between the two neighboring blue pixel columns in an insulating manner, and second data pad connectors connected to the data lines at the two blue pixel columns while being electrically connected to each other through the first data pad connectors.

11. The liquid crystal display of claim 7 wherein the pixel electrodes are formed with a transparent conductive material or a reflective conductive material.

* * * * *